(No Model.) 4 Sheets—Sheet 1.
J. W. ADAMS.
BOLT THREADING MACHINE.
No. 318,678. Patented May 26, 1885.
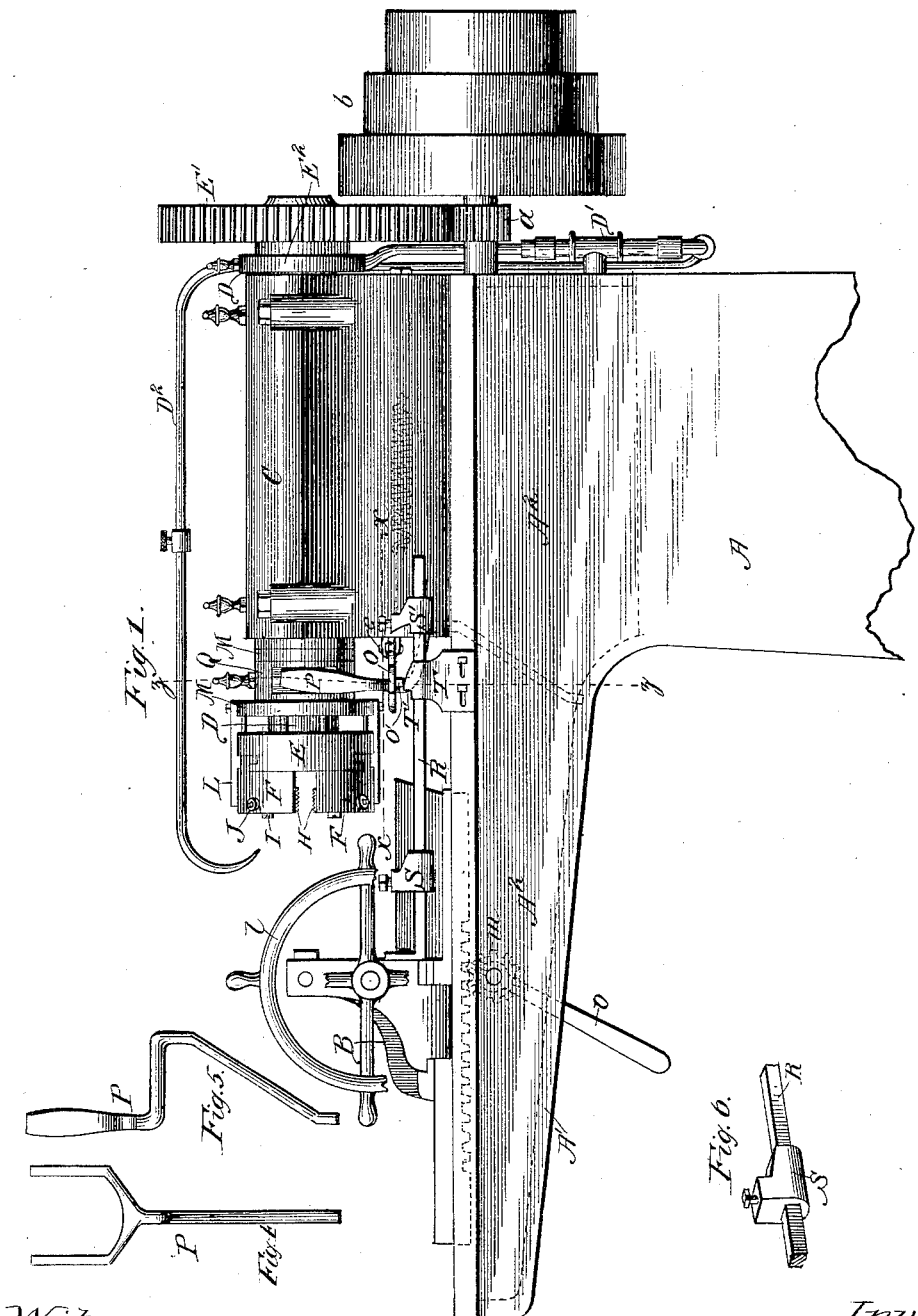
Witnesses.
W. Rossiter
Will R. Onohundro
Inventor
James W. Adams
By Jno. G. Elliott
Atty.

(No Model.) 4 Sheets—Sheet 2.
J. W. ADAMS.
BOLT THREADING MACHINE.
No. 318,678. Patented May 26, 1885.
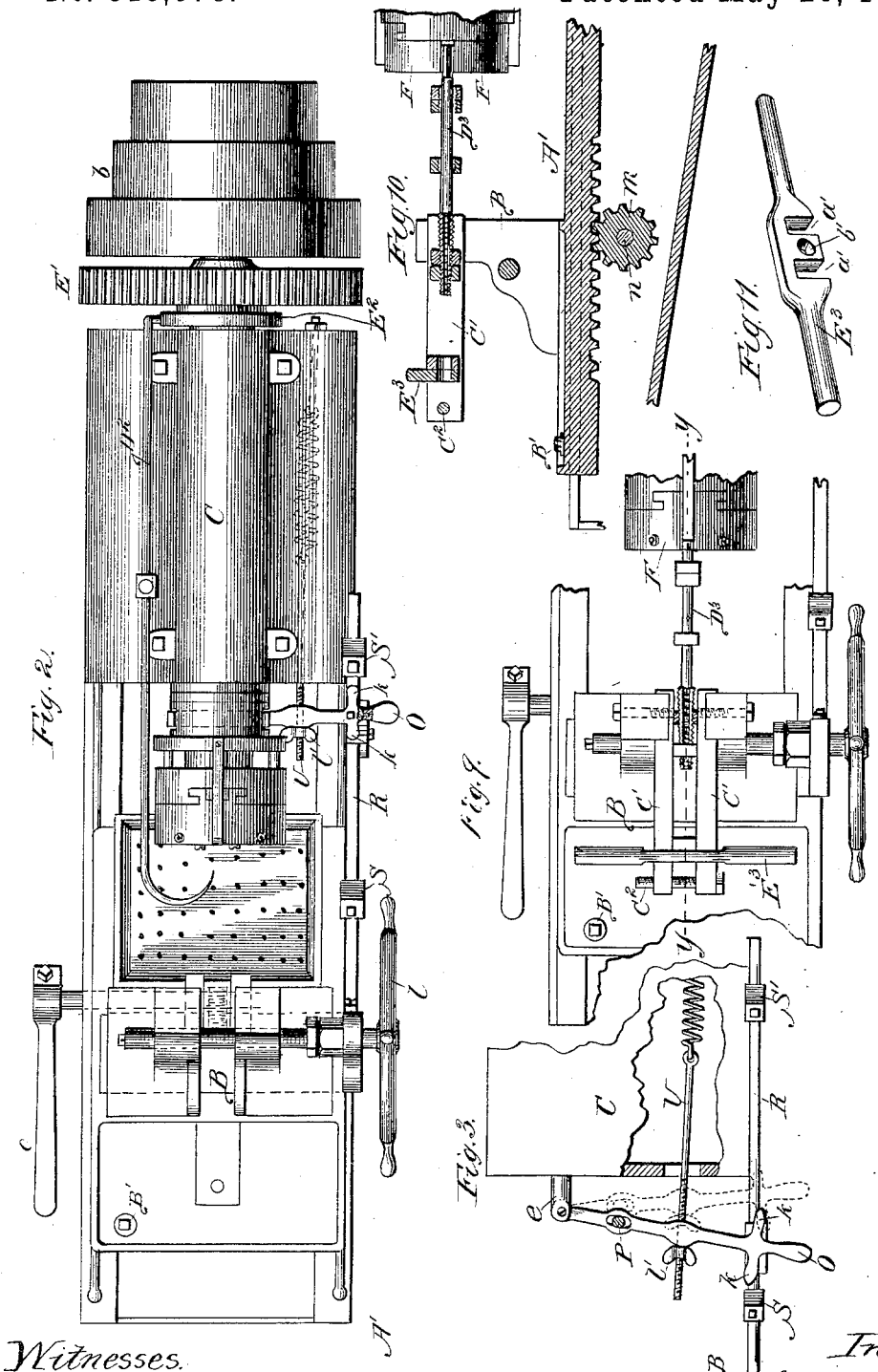
Witnesses
W. Rossler
Will R. Onohundro
Inventor
James W. Adams
By Jno. G. Elliott
Atty.

(No Model.) 4 Sheets—Sheet 3.
J. W. ADAMS.
BOLT THREADING MACHINE.
No. 318,678. Patented May 26, 1885.
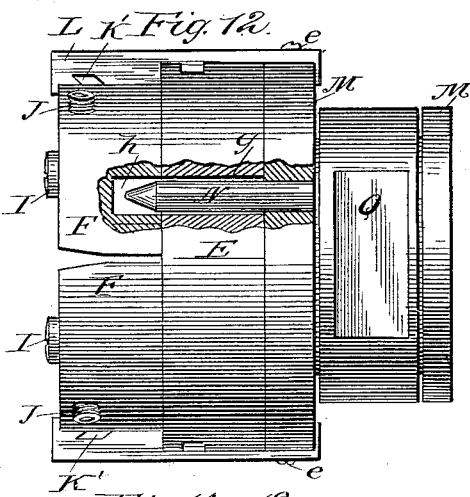
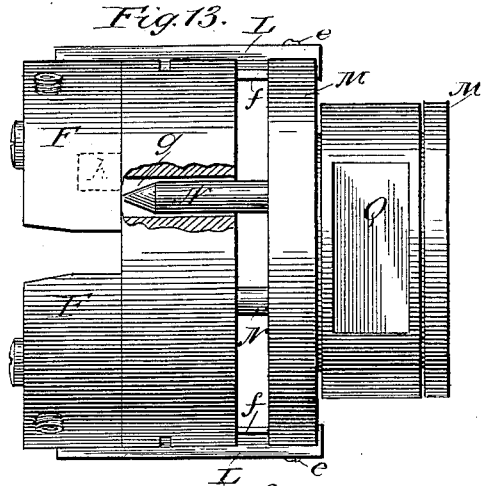
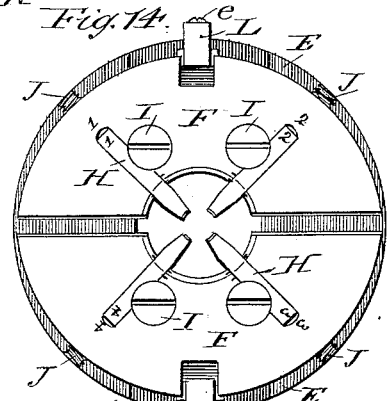
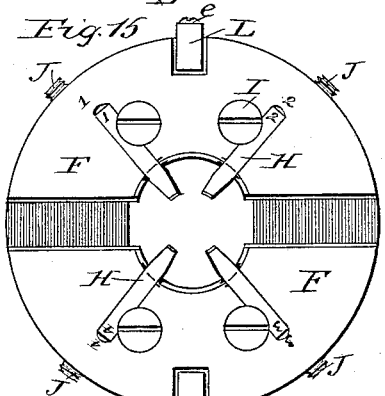
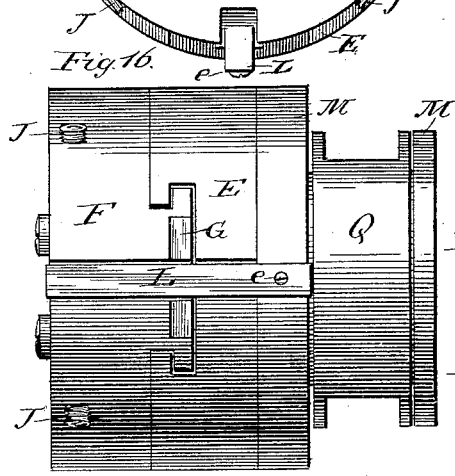
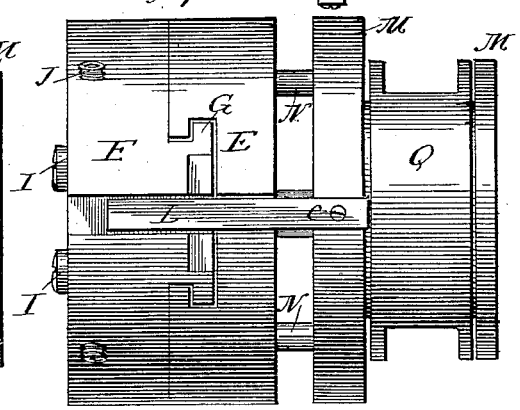
Witnesses
W. Rossiter
W. W. Elliott
Inventor
James W Adams
By Jno. G. Elliott
Atty.

(No Model.) 4 Sheets—Sheet 4.
J. W. ADAMS.
BOLT THREADING MACHINE.
No. 318,678. Patented May 26, 1885.
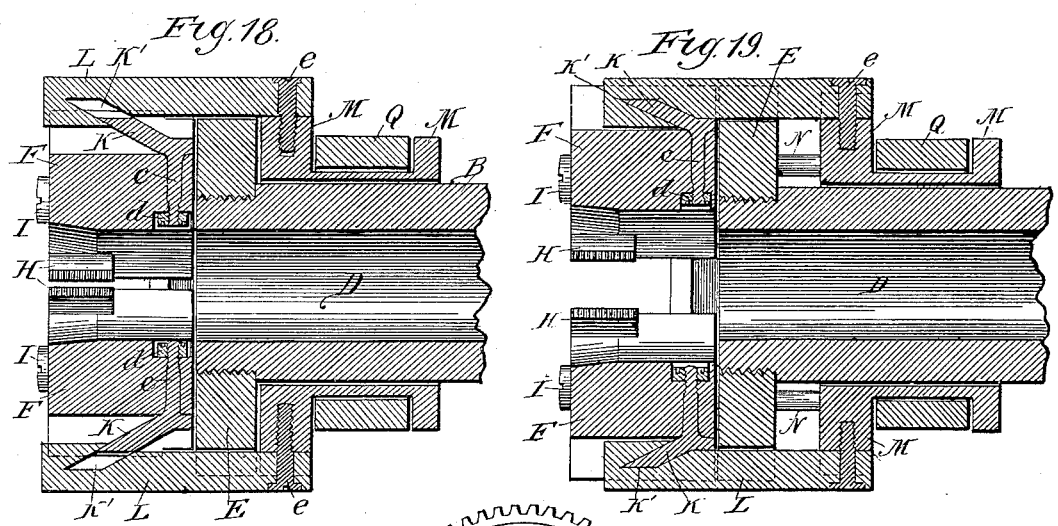
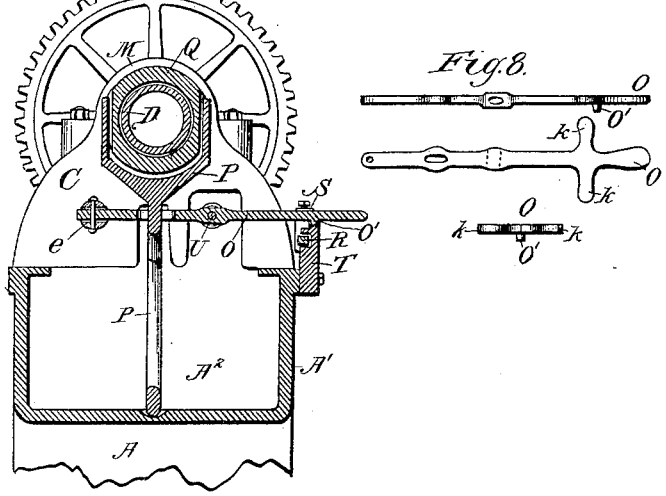
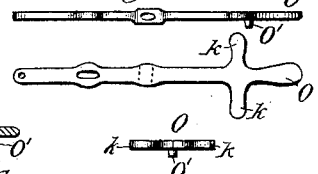
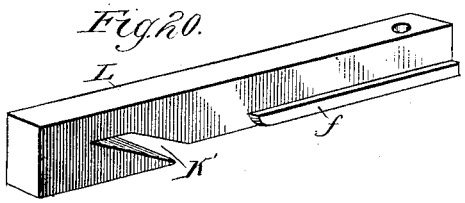
Witnesses.
W. Rossiter
Will R. Onohundro
Inventor:
James W. Adams
By Jno. G. Elliott
Atty.

UNITED STATES PATENT OFFICE.

JAMES W. ADAMS, OF CHICAGO, ILLINOIS.

BOLT-THREADING MACHINE.

SPECIFICATION forming part of Letters Patent No. 318,678, dated May 26, 1885.

Application filed January 26, 1885. (No model.)

*To all whom it may concern:*

Be it known that I, JAMES W. ADAMS, a citizen of the United States, residing in Chicago, county of Cook, and State of Illinois, have invented certain new and useful Improvements in Bolt-Threading Machines, of which the following is a specification.

This invention relates to improvements in bolt-threading machines in which a revolving split head or die carrier is automatically actuated to advance the threading dies or chasers toward or withdraw them from the bolt on a line radial to the axis of rotation of the head and of the dies, and without stopping or reversing the machine.

The objects of my invention are to bodily actuate the two parts of a split head without closing up the ends of the space between them, and by this means have at all times a free and unobstructed passage for the escape from the head of cuttings resulting during the threading process; to connect the split head and sliding collar in such a manner that the strain upon the head and the connection when opening and closing the head will be in a straight line, and a connection of such a character as to exclude dust from its joints, and yet be readily removable when from any cause defective; to provide a directly-operating lock independent of but operating with the connection for opening and closing the head, which lock shall be of such a nature that when in operation the connection referred to shall be entirely relieved from strains.

Further objects of this invention are involved in details of construction hereinafter described, the more important of which are those for gaging the size of screws to be cut, the length of the screw-thread, and for connecting and adjusting the several parts for causing the head to automatically open and close at desired intervals. I attain these objects by devices illustrated in the accompanying drawings, in which—

Figure 1 represents a side elevation of a bolt-threading machine embodying my invention; Fig. 2, a plan view thereof; Fig. 3, a horizontal sectional view on line $x$ $x$, Fig. 1; Figs. 4 and 5, respectively, front and side elevations of the shifting-yoke; Fig. 6, a detail perspective of one of the adjustable stops; Fig. 7, a transverse vertical section on line $z$ $z$, Fig. 1; Fig. 8, a detail view of the shifting-lever; Fig. 9, a plan view of a portion of my machine, showing it with devices attached when used for threading nuts; Fig. 10, a detail sectional view on line $y$ $y$, Fig. 9; Fig. 11, a perspective view of the nut-pusher; Fig. 12, a side elevation of the revolving cutter-head, shown in a closed position, with a portion of the side broken away to show relation of lock-pin and socket; Fig. 13, a similar view of the head open; Fig. 14, a front elevation of the same, showing the head closed; Fig. 15, a similar view showing the head open; Fig. 16, a plan view of the head in a closed position; Fig. 17, a similar view showing the head open; Fig. 18, a central vertical longitudinal section showing the head closed; Fig. 19, a similar view showing the head open, and Fig. 20 a detail perspective of the actuating guide-bar.

Similar letters of reference indicate the same parts in the several figures of the drawings.

A indicates a frame or casting, which supports the operating parts of my invention, provided with an extension or table, A', which forms a support for the chuck-carriage B, which feeds the blanks to the dies. The upper portion is hollow and forms a receptacle, A², for the oil, as indicated in dotted lines in Fig. 1.

Journaled in a suitable casing, C, located at the rear end of the table, is a hollow shaft, D, carrying on its rear end a cog-wheel, E', which, through the medium of spur-wheel $a$ and belt-pulleys $b$, imparts a rotary motion to the shaft. To the other end of the shaft D is screwed or otherwise secured the grooved head-block E, in the grooves of which slide the tongues of the carriers or split heads F F. When screwed into position on the shaft, the end of the shaft and face of the head-block are flush, thus forming a smooth surface over which the die-carriers may pass. The bore in the hollow shaft is of sufficient diameter to admit of the passage of the largest bolt upon which the die-carriers can operate. The die-carriers F, which, when taken together, are approximately circular in cross-section, are provided with tongues G, which work in the grooves in the head-block and form guides for the die-carriers when opening and closing. Radial slots are provided in the front face of the die-carrier for reception of the dies H, which dies are rigidly secured in their respective slots by the screws I. The dies are adjusted to the desired size or diameter of the screw to be cut by means of screws J, projected through the periphery of the split head in line with the dies. The screws I serve more in the capacity of auxiliary supports to prevent the dies from becoming unseated or falling too much to the center. The same result could be accomplished in various ways—as, for instance, by forming a swivel-connection between the die H and screw J, in which case the screw I could be omitted entirely or its place supplied by a "keeping-plate." Near the inner face in the center of the die-carrier, and projecting upwardly and forwardly from its periphery, is cut or otherwise formed a double-inclined tongue, K, which projects into a double-inclined slot, K', in the end of the guide-bar L, which bar is rigidly secured to the flanged sleeve M, working loosely upon the shaft D, just to the rear of the head-block E.

For convenience of substitution in case of wear, it is found preferable to make the tongue K detachable, as shown in Figs. 18 and 19, by means of a spindle, c, screw-threaded on the end, and projecting through the die-carrier into a recess or countersink formed on the under face of the carrier, which receives the nut d, for securing the tongue in place. The guide-bar L is rigidly secured to the flanged sleeve M by the set-screw e, and is provided with flanges f, to form a guiding-connection between the sleeve M and the head-block E. The double-inclined slot K' in the outer end of the guide-bar works on the tongue K when forced in or out by the movement of the sleeve M on the shaft D, and causes the split heads F to approach or recede on a radial line from their center. The flanged sleeve M, the movement of which causes the head to open and close, is connected to the head-block E by the guide-bars L, and, working loosely upon the shaft B, has a longitudinal movement upon the said shaft and rotates with the head-block, to which it is also connected by the lock-pins N. These lock-pins are rigidly secured in the sleeve, as shown in Fig. 12, and pass loosely through openings g in the head-block and enter recesses h, formed in the rear face of the die-carrier. These recesses register with the openings in the head-block when the die-carriers are closed and in working position, thus forming a lock to relieve the guide-bars from strain during the operation of threading a blank.

For the purpose of operating the head a lever, O, is provided and pivoted in the casing C at e, as shown in Fig. 7, through which lever passes the pivotal arm of a yoke, P. This yoke works between suitable flanges on a loose collar, Q, located between the flanges of the sleeve M, and is fulcrumed in a small recess or indentation in the bottom of the oil-well A², as shown in Fig. 7. The free end of the lever O rests upon a rod, R, and is provided with laterally-projecting lugs k, against which the stops S S' on the rod R strike in shifting the head from a closed to an open position, or vice versa.

In order to retain the head in a closed position until opened by the stop S at the completion of the operation of threading a blank, a pin or lug, O', is provided on the under side of the lever, which drops into a notch, T', in the guide-plate T when the lever has reached the extreme of its forward movement and locks the head in a closed position. It is desirable to open the head very quickly to release the work at the proper time, and in order to accomplish this and assist and accelerate the backward movement of the lever a spring-actuated rod, U, is provided, secured to the casing C, as more clearly shown in Fig. 2, and screw-threaded on its outer end, and having a thumb-screw, I', for increasing or diminishing the tension of the spring.

The blank is held and fed into the dies by an ordinary chuck supported on a carriage on the forward end of the table, which chuck is preferably operated by a hand-wheel, l.

For the purpose of returning the carriage to its first position after being drawn forward by the feed of the blank into the dies, the under side of the carriage is provided with a rack, into which gears the pinion m on shaft n, which shaft is rotated by the hand-lever o.

The carriage moves between suitable guides or ways cast on the table, and is provided with a detachable pan to catch the chips and shavings, the bottom of said pan being perforated for the purpose of draining the oil from the chips, which oil flows thence into the well A², from which it is drawn by pump D'.

Rigidly secured to one side of the carriage is one end of the rod R, the free end of which slides on the guide-plate T. This rod is provided with the adjustable stops S and S', which strike against the lugs on lever O at each extreme position of the carriage, and either open or close the head, as the case may be. The working-face of stop S' is inclined slightly backward in order to exert a downward as well as forward pressure, which will tend to force the pin O' into the notch T' on the guide-plate T. This guide-plate is adjustably secured to the side of the frame or table, and its upper surface, upon which the pin O' rides, is slightly inclined and cut away at its forward end to form the notch T', into which the pin catches. The guide-plate is preferably made adjustable for the purpose of adjusting it to the stroke of the lever O, as otherwise great difficulty would be encountered in making such adjustment accurate, and accuracy is very essential in order that the head may be locked in a perfectly-closed position.

Between the casing C and the cog-wheel E' on the hollow shaft D is located an eccentric, E², for operating the pump D', which, through the medium of the telescoping pipe D², supplies a constant feed of oil to the blank while being threaded. This pipe may be extended forward for oiling nuts.

In order to fully comprehend the operation of this machine, it will be observed that Figs. 1 and 2 represent the parts in their positions just before the chuck-carriage has completed its backward movement, the head being still open and the lever about to be engaged by the stop S'. If, now, the chuck-carriage is moved to the limit of its backward movement while the head is revolving continuously in one direction, the head will be closed during the said movement by reason of the stop S' engaging the lever, and the pin on the lever will drop into the notch on the guide-plate, thereby locking the head closed, and if a blank be inserted in the chuck the machine is ready for operation, which operation is as follows: The chuck-carriage is moved forward by means of the hand-lever o until the blank is engaged by the dies, after which engagement the further feed of the blank is automatic by reason of its being drawn forward into the dies by their cutting operation. As the carriage moves forward it carries with it the rod R until the thread is completed, when the stop S engages the lever O, lifting said lever until the pin on its under side clears the notch, at which moment the spring-actuated rod U comes into play, causing the lever to quickly shift its position from that shown in full lines in Fig. 3 to the position indicated by dotted lines in same figure, and open the head, thus releasing the threaded blank or bolt. The operator then moves the hand-lever o in a reverse direction for the purpose of returning the carriage to its first position, the stop S' during said back movement having closed the head again, as before explained. The threaded bolt is then removed and a blank inserted, when the same operation is repeated.

Machines of this character may be employed for tapping nuts, and when used for such work we employ the devices shown in Figs. 9, 10, and 11. A lock or set nut, B', is provided on the carriage, which nut impinges against the table and securely locks the carriage in a suitable position. The chuck-blocks are then removed, and two parallel bars, C', of suitable length are inserted and rigidly secured in their places, and the outer ends of these bars connected by a screw-bolt, C². The dies are removed from the head or die carriers, and their places supplied by ordinary chuck-blocks or die-plate. The square end of a nut-tap, D³, is then inserted and the head closed and locked by the lever O. The thread of the tap projects in between the ends of the bars C'. The head revolves continuously, as in the first case, and a blank nut is placed between the bars and fits snug enough to prevent falling through. The "pusher" E³ is then placed in position behind the nut, straddling the bars C', slots a' a' being provided in the pusher of sufficient depth to bring the center of the opening b' on a line with the center of the tap. The pusher is then moved forward by hand, carrying with it the blank nut, until the end of the tap enters the hole in the nut, when the thread will take hold of the nut and feed it forward while cutting the thread. The pusher is then moved back, another blank inserted, and the operation repeated until the shank of the tap is filled with the threaded nuts, when the tap is removed and the nuts slipped off the rear end.

It will be observed that by doing away with the cam-plates, which have heretofore been used on heads to open and close the head, the possibility of clogging the narrow space between the die-carriers is effectually obviated, as clogging, which soon renders the device imperfect in operation, cannot possibly take place in heads when constructed after the manner I have herein shown and described. It will also be observed that the action of the double inclines in the end of the guide-bar for opening and closing the head is always in a direct line, whereby the friction of the inclines of the tongue and slot working upon each other is reduced to a minimum.

Having described my invention, what I claim, and desire to secure by Letters Patent, is—

1. The split heads, the actuating-shaft therefor, and a sleeve upon said shaft, in combination with bars arranged on one side of a line through the meeting faces of the split head, and connecting both parts of the split head with the collar, substantially as described.

2. The split head, the actuating-shaft, and a sleeve, in combination with bars sliding upon the head and rigidly secured to the collar, substantially as described.

3. The actuating-shaft, the split head, and the sleeve, in combination with the connecting-bars provided with inclined grooves and corresponding projections on the head engaging said grooves, substantially as described.

4. The split heads and the tongues removably secured thereto, in combination with the sleeve and the grooved bar secured to said sleeve, and provided with corresponding grooves engaging the tongue on the head, substantially as described.

5. The split head, the sliding sleeve, and a connection between the sleeve and head for actuating the latter, in combination with a locking device connecting said head and sleeve when the head is closed, whereby the connection for opening and closing the head is relieved from strain during the threading operation, substantially as described.

6. The split head, the sleeve, and devices for actuating the head, in combination with a head-block and locking-pins secured to the sleeve, passing through the head-block, and engaging and locking the head when closed, substantially as described.

7. The combination of the split head, the inclined projection thereon, and the sleeve with a bar connecting the sleeve and engaging said projection, and provided with longitudinal ribs, substantially as described.

8. In a screw-threading machine, the shaft and the sleeve sliding thereon, in combination with a yoke provided with a stem having an end bearing, and a lever straddling and for actuating said yoke to reciprocate the sleeve, substantially as described.

9. The shaft, the sleeve, and the yoke, in combination with the lever straddling the yoke, a notched plate, and a stud upon the lever for engaging the notch thereof, substantially as described.

10. The shaft, the sleeve, and the actuating-lever therefor, provided with a stud, in combination with an adjustable notched plate for engaging the stud and a spring for actuating the said lever, substantially as described.

11. The shaft, the sleeve, and the actuating-lever therefor, provided with a stud, in combination with an adjustable notched plate for engaging the stud, a spring for actuating said lever, and means for adjusting the tension of the spring, substantially as described.

12. The sleeve, the yoke, the lever, and the stud thereof, in combination with a rod or bar actuated by the feed-carriage and provided with stops engaging the lever, substantially as described.

13. The sleeve, the yoke, the lever, and the notched plate, in combination with the bar and the adjustable stops thereon, provided with reversely-inclined faces engaging the lever, and means for actuating said bar and stops, substantially as described.

14. In a screw-threading machine, a feed-carriage, an oil-receptacle below the path of the same, and a removable perforated pan on the feed-carriage, substantially as described.

15. The feed-carriage, in combination with the bars C' C' and means for adjusting the same to clamp the nut, a nut-pusher, and a revolving split head, and a screw-tap held by said head, substantially as described.

JAMES W. ADAMS.

Witnesses:
W. W. ELLIOTT,
JNO. G. ELLIOTT.